(12) United States Patent
Sallen Rosello et al.

(10) Patent No.: US 7,618,230 B2
(45) Date of Patent: Nov. 17, 2009

(54) SELF-PROPELLED ROBOT FOR THE HANDLING OF EXPLOSIVE CHARGES

(75) Inventors: Cesar Sallen Rosello, Binefar (Huesca) (ES); Alfredo Sallen Rosello, Binefar (Huesca) (ES); Roberto Torres Pueo, Binefar (Huesca) (ES)

(73) Assignee: Proyectos y Tecnologia Sallen, S.L., Binefar Huesca (ES)

( * ) Notice: Subject to any disclaimer, the term of this patent is extended or adjusted under 35 U.S.C. 154(b) by 80 days.

(21) Appl. No.: 11/547,642

(22) PCT Filed: Apr. 6, 2005

(86) PCT No.: PCT/ES2005/000183

§ 371 (c)(1),
(2), (4) Date: Jun. 27, 2007

(87) PCT Pub. No.: WO2005/097432

PCT Pub. Date: Oct. 20, 2005

(65) Prior Publication Data

US 2008/0029317 A1    Feb. 7, 2008

(30) Foreign Application Priority Data

Apr. 6, 2004    (ES) .............................. 2007400849

(51) Int. Cl.
*B25J 5/11*    (2006.01)
(52) U.S. Cl. .......................... 414/729; 414/680; 901/15; 74/490.01
(58) Field of Classification Search ................. 414/680, 414/685, 729; 172/815, 825; 180/9.48; 212/294; 52/111, 116; 37/281, 283; 74/490.01; 901/15
See application file for complete search history.

(56) References Cited

U.S. PATENT DOCUMENTS

| | | | | |
|---|---|---|---|---|
| 5,217,344 A | * | 6/1993 | Gendrault et al. | ........... 414/729 |
| 5,451,135 A | * | 9/1995 | Schempf et al. | ............. 414/694 |
| 5,672,044 A | * | 9/1997 | Lemelson | ................ 414/744.3 |
| 5,819,444 A | * | 10/1998 | Desmarais | ................... 37/281 |
| 5,918,390 A | | 7/1999 | Ruff et al. | |
| 6,113,343 A | | 9/2000 | Goldenberg et al. | |
| 6,145,610 A | * | 11/2000 | Gallignani | ................. 180/9.48 |

FOREIGN PATENT DOCUMENTS

| | | |
|---|---|---|
| DE | 24 09 027 | 9/1975 |
| JP | 2000-326875 | 11/2000 |
| JP | 2004-60195 | 2/2004 |

* cited by examiner

*Primary Examiner*—Donald Underwood
(74) *Attorney, Agent, or Firm*—Wenderoth, Lind & Ponack, LLP

(57) ABSTRACT

A self-propelled robot is used to handle explosive charges and is of the type that is remote controlled by a control console. The robot can be used to handle explosive devices and charges as well as perform special, dangerous operations. The self-propelled robot includes a chassis, and two laterally spaced-apart endless tracks having adjustable lateral spacing, and an adjustable-length scraper disposed at the front thereof. The robot also includes an articulated arm having a first segment which takes the form of a fork that is actuated by a pair of cylinders and which terminates in a clamp. The articulated arm is foldable between an extended position and a folded condition.

11 Claims, 3 Drawing Sheets

SELF-PROPELLED ROBOT FOR THE HANDLING OF EXPLOSIVE CHARGES

BACKGROUND OF THE INVENTION

The present invention is directed to a self-propelled robot remotely controlled by means of a control console, having application for performing a range of dangerous operations, and being of special application for the handling of explosive devices and charges.

Conventionally, when it has been necessary to handle explosive devices or perform risky operations, and even more so, when human lives are at risk, robots that are operated remotely by means of a control console have been used.

Among robots existing for the handling of explosive devices, there are the type which include an articulated arm, with a single segment, and without any possibility of rotating in a horizontal plane. This type of robot only has movement in a vertical plane and is limited by its single articulated segment.

Likewise, this type of robot has a series of control elements, such as viewing cameras and proximity sensors.

Also, Spanish patent P200302384, from the same inventor as the present application, discloses a self-propelled robot that has means of movement defined by two sets of side wheels and two independent motors, each of which transmits movement to a set of side wheels, in such a way that not all the wheels have the same diameter, which grants less strength than the robot of the present invention.

SUMMARY OF THE INVENTION

The present specification describes a self-propelled robot for the handling of explosive charges and which is of the type that is remotely controlled by means of an operating and control console. The robot is especially used for the handling of explosive charges and devices and for performing special, dangerous operations in general, such that the self-propelled robot comprises a chassis, and means of movement which are defined by caterpillar tracks (endless tracks), with running sides adjustable in relation to each other. Such robot is powered by a diesel, gasoline or electric motor, incorporates an adjustable-length scraper in its front part, and has an articulated arm defined by four segments, the first segment having the general form of a fork, and terminating at its end with a clamp provided with specific rotary movement.

So, in the operation of handling heavy loads the caterpillar running gear (endless tracks) on both sides will be displaced (laterally) by means of the corresponding hydraulic cylinders, directed by guides towards the outside, granting it great stability.

Likewise, the adjustable-length scraper actuated by a cylinder in its up and down movement includes rotary arms on both sides, with a first (folded) position in which the rotary arms are withdrawn on the scraper (i.e. folded in superposed relation with the center scraper part) such that a length of the scraper is adapted to the spacing of the withdrawn running gear (endless tracks) and with a second (extended) position in which the rotary arms are aligned with a center scraper part, such that a length of the scraper is adjusted to the extended running gear.

The first segment relative to the articulated arm presents the form of a fork and is actuated by a pair of cylinders.

Moreover, the four segments making up the articulated arm are actuated by respective cylinders and the clamp has specific means of rotation, left and right, in order to provide it with great maneuverability.

In this way, when the articulated arm is folded upon itself, the clamp body passes between the pair of prongs of the first segment, thereby occupying minimum space.

Indeed, the self-propelled robot presents great robustness and is endowed with great maneuverability, being able to haul and handle heavy loads.

So, as the running gear is defined by caterpillar tracks (endless tracks), this permits its displacement over all kinds of uneven terrain, having great mobility, and perfect grip on all kinds of ground.

With the aim of facilitating all the operations to be performed by the self-propelled robot, the robot includes a series of viewing cameras and proximity sensors.

In order to complement the description that is going to be made, and with the aim of aiding a better understanding of the characteristics of the invention, this specification is accompanied by a set of drawings containing figures in which, on an illustrative rather than limiting basis, the most characteristic details of the invention are represented.

DETAILED DESCRIPTION OF A PREFERRED EMBODIMENT

Figure 1:
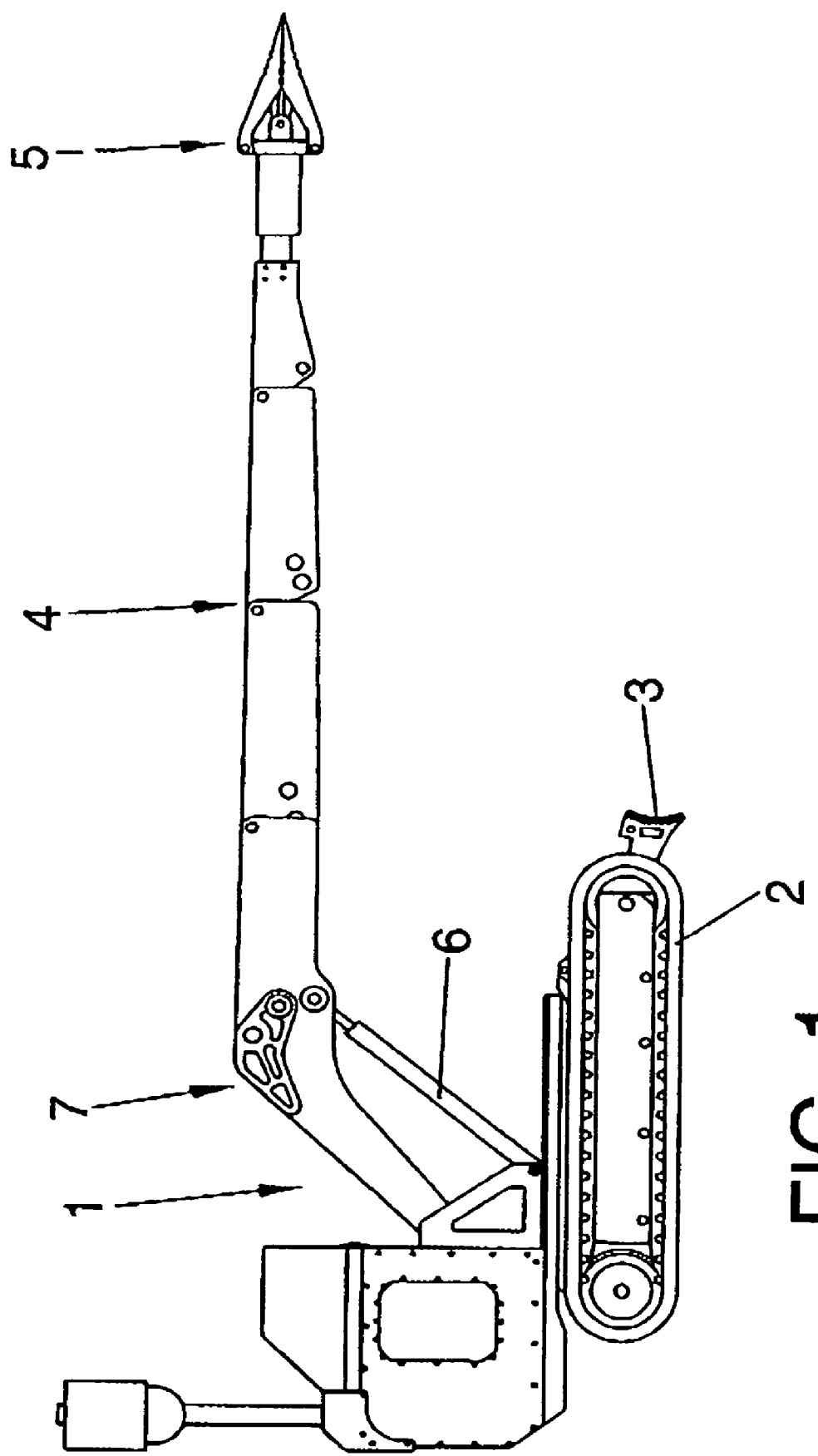
FIG. 1 is a lateral elevation view of a self-propelled robot according to the present invention, showing an articulated arm in its extended position.

As shown in the drawings, a self-propelled robot 1 for the handling of explosive devices and charges has a chassis, and means of displacement defined by two sets of lateral caterpillar running gear (endless tracks) 2 driven by conventional means, such as a diesel, gasoline or electric motor, and incorporating a scraper 3 in its front part, along with an articulated arm 4 terminating in a clamp 5.

An important characteristic of the self-propelled robot 1 is that it displays great robustness which permits it to haul and handle heavy loads and likewise, via its running gear, based on caterpillar tracks 2, it can displace itself over all kinds of uneven terrain, having great mobility.

Moreover, with the aim of providing the robot 1 with great stability in the handling of heavy loads, the two sets of lateral caterpillar running gear 2 are mounted on a structure which permits separation between both sides by means of operating a simple push-button, in such a way that, when heavy loads have to be handled, the sides of the caterpillar 2 can be separated such that the robot 1 will acquire great stability, thus representing a major advantage.

So, the caterpillar sides 2 are mounted by means of a pair of telescopic cross-members 8, in such a way that by means of respective hydraulic cylinder 9, activated by means of an activation push-button, they will be able to be positioned at different distances from each other.

Figure 4:
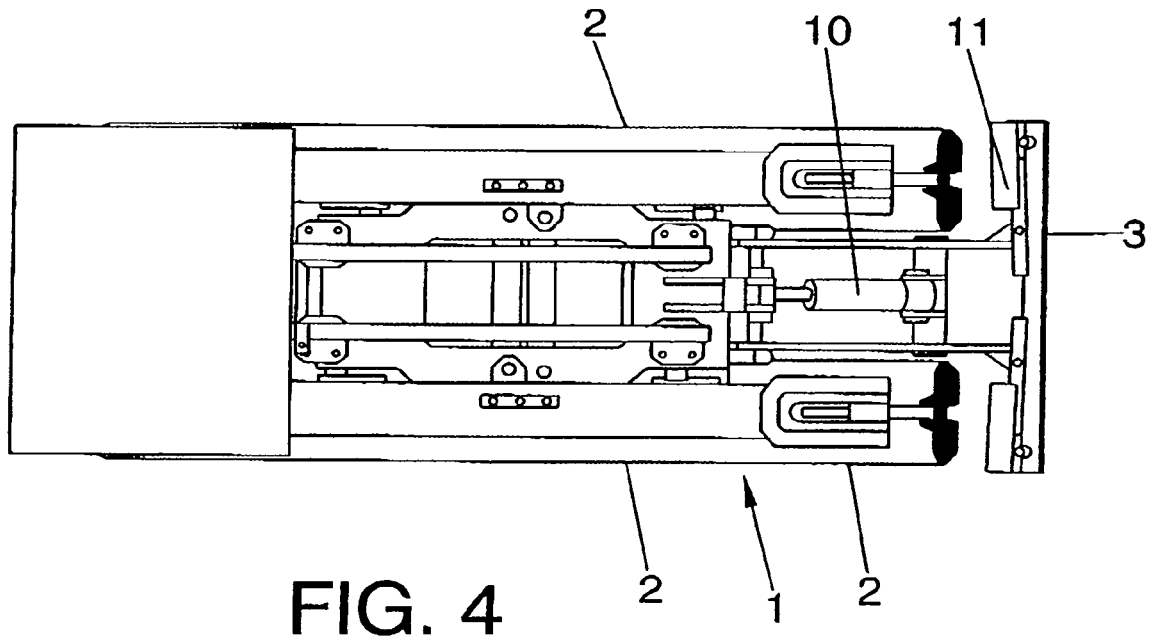
FIG. 4 is a plan view of the self-propelled robot according to the present invention, showing endless tracks in a withdrawn position.
Figure 5:
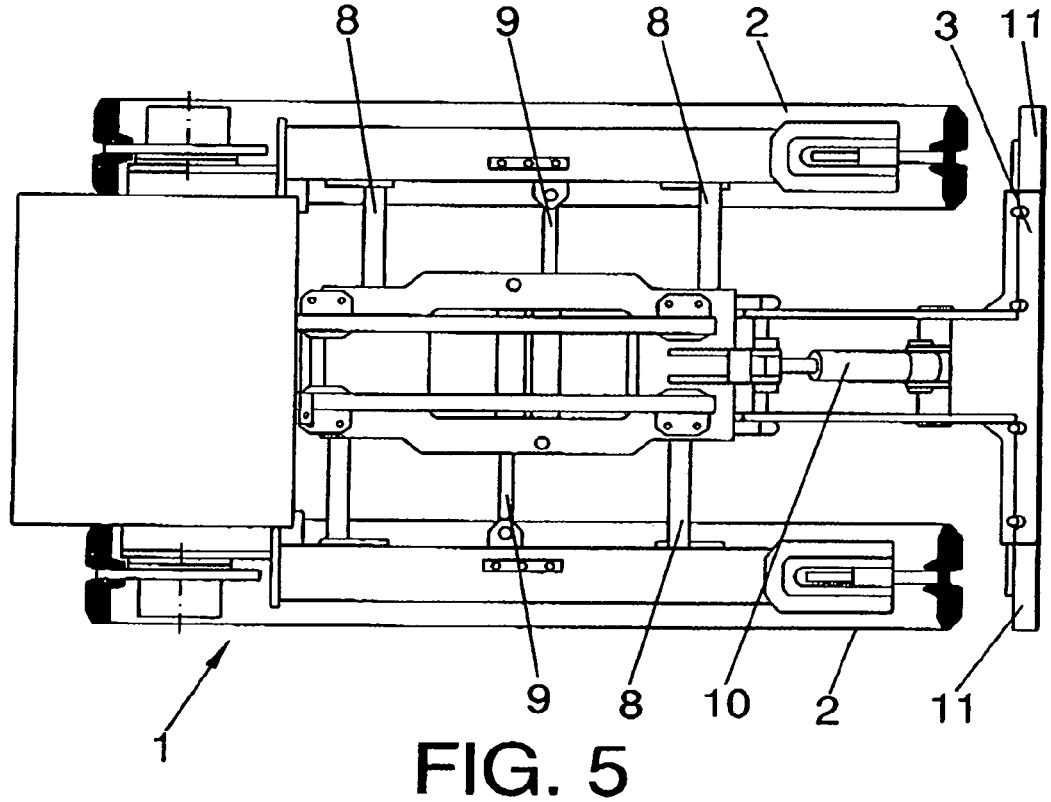
FIG. 5 is a plan view of the self-propelled robot according to the present invention, showing the endless tracks in an extended position.

Also, the scraper 3, actuated by a cylinder 10 in its up and down movement, has an adjustable length, for which it has individual rotary arms 11 at each end of a center scraper part, thereby permitting the scraper to adapt its length to that of the running gear, depending on whether it is in its withdrawn (folded) or extended position, as can be seen in FIGS. 4 and 5.

The rotary arms 11 are actuated by means of respective cylinders.

Furthermore, the articulated arm 4 has mounted thereto the corresponding hydraulic cylinders of the different segments thereof, so that the first segment 7 is actuated by a pair of cylinders 6, for which it incorporates a hydraulic unit, while in order to effect the rotary movements to left and right of the clamp 5 it incorporates an electric motor, in such a way that the articulated movements of the four segments making up the articulated arm 4 are effected by corresponding actuation cylinders, which have independent action.

In the drawings, the great maneuverability of the articulated arm 4 can be seen, and it can be observed how it passes from its extended position (FIG. 1) to a position of being folded on itself (FIG. 2), thereby occupying minimum space.

Figure 2:
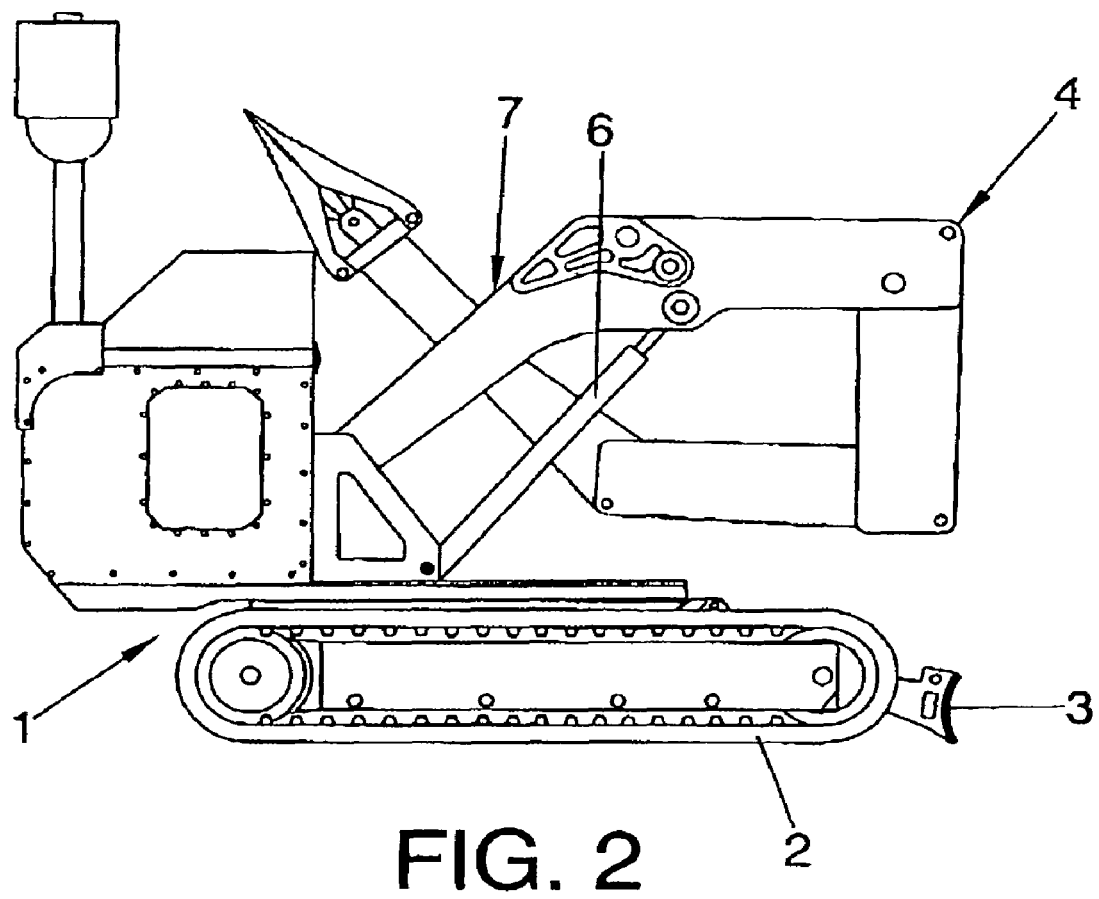
FIG. 2 is a lateral elevation view of the self-propelled robot according to the present invention, showing the articulated arm in its folded position.
Figure 3:
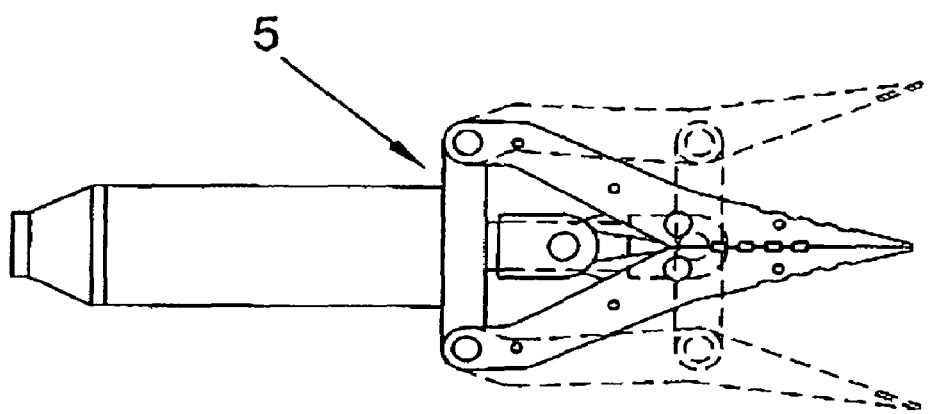
FIG. 3 is a plan view of a gripping clamp of the self-propelled robot of the present invention, showing closed and open positions.

This is achieved as a consequence of providing the first segment 7 of the articulated arm in the form of a fork with the clamp 5 being able to pass between its two prongs as it folds (FIG. 2). As shown in the folded condition in FIG. 2, the first segment 7 includes a first portion extending upwardly and rearwardly, and a second portion inclined at an angle relative to the first portion and extending substantially horizontally rearwardly.

Of course, the self-propelled robot 1 incorporates the corresponding control electronics with all incidents appearing on a screen in the control console.

Likewise, the self-propelled robot 1 will incorporate a series of ultrasound distance meters and viewing cameras, permitting all necessary operations to be performed.

Moreover, the clamp 5 can present different characteristics depending on the work to be carried out, and so the clamps can cut, haul, lift and even destroy objects.

The invention claimed is:

1. A remotely-controlled self-propelled robot for the handling of explosive charges, comprising:
   a chassis;
   a pair of laterally spaced-apart endless tracks for moving the chassis in a running direction, said endless tracks being adjustably disposed in a laterally spaced-apart relationship such that an amount of space laterally between said endless tracks is adjustable;
   an adjustable-length scraper mounted at a front of said chassis so as to be adjustable in length in a lateral direction of said chassis;
   an articulated arm provided at a front of said chassis, said articulated arm having a plurality of mutually articulable segments including a first segment pivotably connected to said chassis;
   a clamp provided at an end of said articulated arm; and
   at least one hydraulic cylinder connected between said chassis and said first segment for actuating movement of said articulated arm;
   wherein said first segment of said articulated arm includes a first portion connected to said chassis, and a second portion inclined at an angle relative to said first portion;
   wherein said first segment is fork-shaped such that at least said first portion thereof has two spaced-apart prong portions;
   wherein said at least one hydraulic cylinder is connected to said first segment near an intersection of said first and second portions of said first segment; and
   wherein said articulable segments of said articulated arm are mutually connected so that said articulated arm is foldable between an extended condition in which said articulable segments extend forwardly of said chassis, and a folded condition in which said first portion of said first segment extends upwardly and rearwardly, said second portion of said first segment extends substantially horizontally rearwardly, and a portion of said articulated arm extends between said spaced-apart prong portions of said first portion of said first segment of said articulated arm such that said clamp and a portion of said articulated arm are extended rearwardly beyond said spaced-apart prong portions of said first portion of said first segment of said articulated arm.

2. The remotely-controlled self-propelled robot according to claim 1, wherein
   said articulated arm and said clamp are configured and arranged such that, when said articulated arm is in said folded condition, said clamp is superposed vertically above said chassis and said endless tracks.

3. The remotely-controlled self-propelled robot according to claim 2, further comprising
   telescopic cross-members mounting said laterally spaced-apart endless tracks to said chassis; and
   at least one hydraulic cylinder operably connected to said laterally spaced-apart endless tracks for adjusting the lateral space therebetween.

4. The remotely-controlled self-propelled robot according to claim 3, wherein
   said adjustable-length scraper includes a laterally-extending center scraper part and rotary arms at laterally-opposing ends of said laterally-extending center scraper part for adjusting the length of the adjustable-length scraper in the lateral direction of said chassis.

5. The remotely-controlled self-propelled robot according to claim 4, wherein
   said adjustable-length scraper is configured to be folded between an extended condition in which said rotary arms extend laterally away from said laterally-extending center scraper part, and a folded condition in which said rotary arms are folded in superposed relation with said laterally-extending center scraper part.

6. The remotely-controlled self-propelled robot according to claim 1, further comprising
   telescopic cross-members mounting said laterally spaced-apart endless tracks to said chassis; and
   at least one hydraulic cylinder operably connected to said laterally spaced-apart endless tracks for adjusting the lateral space therebetween.

7. The remotely-controlled self-propelled robot according to claim 6, wherein
   said adjustable-length scraper includes a laterally-extending center scraper part and rotary arms at laterally-opposing ends of said laterally-extending center scraper part for adjusting the length of the adjustable-length scraper in the lateral direction of said chassis.

8. The remotely-controlled self-propelled robot according to claim 7, wherein
   said adjustable-length scraper is configured to be folded between an extended condition in which said rotary arms extend laterally away from said laterally-extending center scraper part, and a folded condition in which said rotary arms are folded in superposed relation with said laterally-extending center scraper part.

9. The remotely-controlled self-propelled robot according to claim 1, wherein said adjustable-length scraper includes a laterally-extending center scraper part and rotary arms at laterally-opposing ends of said laterally-extending center scraper part for adjusting the length of the adjustable-length scraper in the lateral direction of said chassis.

10. The remotely-controlled self-propelled robot according to claim 9, wherein said adjustable-length scraper is configured to be folded between an extended condition in which said rotary arms extend laterally away from said laterally-extending center scraper part, and a folded condition in which said rotary arms are folded in superposed relation with said laterally-extending center scraper part.

11. The remotely-controlled self-propelled robot according to claim 1, wherein said at least one hydraulic cylinder comprises plural hydraulic cylinders.

* * * * *